United States Patent
Yu et al.

(10) Patent No.: US 8,711,003 B2
(45) Date of Patent: Apr. 29, 2014

(54) VEHICLE LOCATION INFORMATION-BASED ABNORMAL DRIVING DETERMINATION AND WARNING SYSTEM

(75) Inventors: Tae Young Yu, Gyeonggi-do (KR); Hyun Cheol Bae, Gyeonggi-do (KR); Chung Hi Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 162 days.

(21) Appl. No.: 13/323,218

(22) Filed: Dec. 12, 2011

(65) Prior Publication Data
US 2013/0088369 A1   Apr. 11, 2013

(30) Foreign Application Priority Data
Oct. 11, 2011   (KR) .................. 10-2011-0103715

(51) Int. Cl.
*G08G 1/09*   (2006.01)
(52) U.S. Cl.
USPC ................... 340/905; 340/573.1; 340/459
(58) Field of Classification Search
USPC .............. 340/905, 573.1, 576, 575, 438–439, 340/903, 990, 991, 459
See application file for complete search history.

(56) References Cited

U.S. PATENT DOCUMENTS

| | | | |
|---|---|---|---|
| 6,262,657 B1 * | 7/2001 | Okuda et al. ................. | 340/439 |
| 2005/0043867 A1 * | 2/2005 | Kudo ............................. | 701/23 |
| 2005/0278118 A1 * | 12/2005 | Kim .............................. | 701/213 |
| 2007/0109106 A1 * | 5/2007 | Maeda et al. ............... | 340/426.1 |
| 2007/0250268 A1 * | 10/2007 | Matsui ........................ | 701/301 |
| 2008/0012698 A1 * | 1/2008 | Kobayashi et al. ........... | 340/442 |

FOREIGN PATENT DOCUMENTS

| | | |
|---|---|---|
| EP | 2 296 124 A1 | 3/2011 |
| JP | 10-166891 | 6/1998 |
| JP | 10-166891 | 6/1998 |
| JP | 2003-312307 A | 11/2003 |
| JP | 2010-102538 A | 5/2010 |
| JP | 2011-008457 A | 1/2011 |
| KR | 10-1998-085351 | 12/1998 |
| KR | 10-2010-0034364 | 4/2010 |

* cited by examiner

*Primary Examiner* — Daniel Previl
(74) *Attorney, Agent, or Firm* — Edwards Wildman Palmer LLP; Peter F. Corless

(57) ABSTRACT

The disclosed system includes a first unit including at least one sensor. The first unit senses driving situations (characteristics) of a vehicle through the at least one sensor. Furthermore a second unit is configured to receive location-based information about the vehicle, and a control unit which includes an operation statistic unit calculates an acceptable range to be output by the first unit on a particular type of road based on the information detected by the sensing unit and the information received by the location second unit. The control unit also includes an abnormal driving determination unit which compares values sensed by the first unit with values calculated by the operation statistic unit to determine whether or not the vehicle is being driven in an abnormal state.

22 Claims, 4 Drawing Sheets

VEHICLE LOCATION INFORMATION-BASED ABNORMAL DRIVING DETERMINATION AND WARNING SYSTEM

CROSS-REFERENCES TO RELATED APPLICATIONS

This application claims priority to Korean patent application No. 10-2011-103715 filed on Oct. 11, 2011, the disclosure of which is hereby incorporated in its entirety by reference,

BACKGROUND OF THE INVENTION

1. Field of the Invention

The present invention relates to a system configured to sense abnormal driving of a vehicle and provide a warning to a driver, and more particularly, to an abnormal driving state determination and warning system which determines a driving state of a driver based on a vehicle location information and automatically outputs a warning message to the driver when the system senses a dangerous situation without adding an additional component to the vehicle.

2. Description of the Related Art

Traffic accidents can occur for many different reasons, among them being driver negligence and unexpected risks due to the road conditions. Among the factors, a couple of the most common causes are speeding or drowsiness. These conditions can cause serious accidents leading to personal injury or even death.

In an effort to solve the problem, major automobile manufacturers continue to develop various new systems for assisting driver's in safe vehicular operation and apply these new systems to the vehicles.

Some manufactures have developed techniques which are able to determine when the driver is becoming drowsy by sensing a driver's reactions and movement using a camera or monitoring the driver's pulse through a sensor.

When using the above described camera method, the camera photographs the driver's face via a camera installed inside a vehicle, processes the photo and analyzes the photo to recognize drooping and blinking patterns of the driver's eyelids and movement of the driver's pupils, and determines whether the driver is becoming drowsy based on the recognized result.

In the pulse monitoring technique, the driver's pulse is used to determine whether the driver is becoming drowsy based on the reduction in the driver's pulse which is often reduces as people fall asleep.

However, these previous techniques require very complicated and complex components such as the sensors and processors for detecting the driver's pulse rate and performing the analysis algorithm thereof or the camera for capturing the movement of pupil, hardware for processing the photographed images, and analysis algorithms thereof, are required. In addition, even when these components are included, only the abnormal driving due to the drowsy driving can be detected so that it is economically inefficient in comparison with its intended result compared to the cost required to implement the system

SUMMARY OF THE INVENTION

Various aspects of the present invention have been made in view of the above problems, and provide a vehicle location information-based abnormal driving determination and warning system which determines the driving state of a driver based on vehicle location information and automatically outputs a warning message to the driver when sensing a dangerous situation without installing additional components in the vehicle that are not typically required.

Various aspects of the present invention provide a vehicle location information-based abnormal driving determination and warning system which determines an abnormal driving state of a driver. The system may include: a sensing unit configured to include at least one sensor and sense a driving situation of a vehicle through the at least one sensor; a location information reception unit configured to receive location-based information of the vehicle; an operation statistic unit configured to calculate an acceptable range to be output from the sensing unit on a current traveling road on the basis of the information detected by the sensing unit and the location-based information received from the location information reception unit; and an abnormal driving determination unit configured to compare values sensed by the sensing unit with values calculated by the operation statistic unit to determine whether or not the vehicle is being driven in an abnormal state.

The system may further include a data storage unit configured to cumulatively store the values calculated by the operation statistic unit for a constant time and manage the cumulatively stored data as reference data. The abnormal driving determination unit may compare the values sensed by the sensing unit with the reference data stored in the data storage unit to determine whether or not the vehicle is driven in an abnormal state.

The abnormal driving determination unit may determine a current driving state as an abnormal driving state when at least one of the values sensed by the sensing unit is deviated from the acceptable range calculated by the operation statistic unit.

The abnormal driving determination unit may determine a current driving state to be an abnormal driving state when at least one of values sensed by the sensing unit is deviated from a range of the reference data stored in the data storage unit.

The sensing unit may include at least one selected from the group consisting of a steering angle sensor (SAS), a vehicle speed sensor, an acceleration sensor, and an angular velocity sensor. Furthermore, the location-based information may include at least one selected from the group consisting of global positioning system (GSP) location information, map information, road information, and traffic information.

The system may further include a warning display unit configured to output a warning message according to control of the abnormal driving determination unit.

A wireless communication unit configured to access an external network may be included in a vehicle. An operation server, which is connected to the external network and configured to collect at least one piece of information transmitted from the wireless communication unit of the vehicle and perform integral management, may be further included outside the vehicle. The abnormal driving determination unit may transmit location information from a point in which the abnormal driving state is confirmed during driving to the operation server through the wireless communication unit.

The operation statistic unit and the abnormal driving determination unit may be included in a control unit embodied as an electronic control unit (ECC).

The operation server may be configured to periodically transmit the collected information to at least one vehicle. The abnormal driving determination unit inside the vehicle may be configured to determine a dangerous area or zone based on the information received from the operation server through the wireless communication unit and to output the warning message through the warning display unit.

According to the system having the above described configuration of the exemplary embodiment of the present invention, it is possible to simply determine a driving state based on location information of a vehicle without additional high cost and complicated components and thus it is possible to provide an efficient cost effective abnormal driving determination system having high reliability with minimal fabrication cost.

In addition, as a determination result of the driving state, when the driving state is checked and a dangerous status is expected, an immediate warning is provided to a driver through a warning lamp or a voice message so that occurrence of accident can be prevented.

The systems of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION

Figure 1:
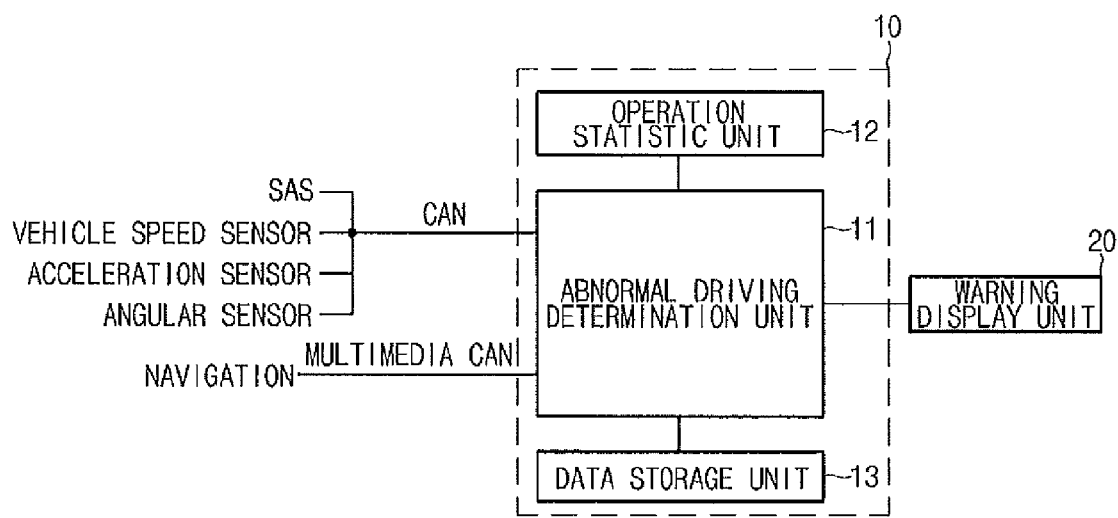
FIG. 1 is a functional block diagram illustrating a vehicle location information-based abnormal driving determination and warning system according to an exemplary embodiment of the present invention.

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a functional block diagram illustrating a vehicle location information-based abnormal driving determination and warning system according to an exemplary embodiment of the present invention. In FIG. 1, the reference numeral 11 is an abnormal driving determination unit which receives pieces (data) of driving condition sensing information transmitted through a control area network (CAN) (e.g., road conditions) and location-based information transmitted through a multimedia CAN, determines whether an abnormal driving situation is occurring based on the information supplied, and warns the driver when an abnormal driving situation is occurring. The driving condition sensing information transmitted through the CAN contains portions of output information from a steering angle sensor (SAS), a vehicle speed sensor, an acceleration sensor, an angular velocity sensor, and the like. The location-based information transmitted through the multimedia CAN is navigation information such as global positioning system (GPS) location information, map information, road information, and traffic information.

The reference numeral 12 is an operation statistic unit which calculates an acceptable range of each portion of sensing information on a current traveling road based on the driving condition sensing information and the location-based information. The reference numeral 13 is a data storage unit which cumulatively stores the value calculated by the operation statistic unit for a specific period of time and manages the cumulatively stored value as reference data. The reference numeral 20 is a warning display unit which outputs a warning message according to control of the abnormal driving determination unit 11.

The abnormal driving determination unit 11 and the operation statistic unit 12 may be integrated within a control unit embodied as an electronic control unit (ECU). Alternatively, the abnormal driving determination unit 11 and the operation statistic unit 12 may be implemented as separate components.

Next, an operation of the system having the above-described configuration will now be described.

Various kinds of sensors mounted in the vehicle sense measurement information required to determine the diving state of the vehicle and transmits the sensed measurement information through the CAN. The abnormal driving determination unit 11 is connected to the SAS, the vehicle speed sensor, the acceleration sensor, the angular velocity sensor, and the like through the CAN and to the navigation through the multimedia CAN. The abnormal driving determination unit 11 in the control unit 10 receives information related to the driving state from the various sensors inside the vehicle and current location information of the vehicle, road information, traffic information, and the like through the multimedia CAN.

A contracted operation and statistical treatment on the collected information is performed by the operation statistic unit 12. An operation and statistic treatment process performed by the operation statistic unit 12 is executed by algorithms and includes calculating relative relation indexes for output values of the sensors, comparing calculation results respectively, and outputting a comparison result as statistic information over a predetermined time period. That is, when a vehicle is driving on a highway, the abnormal driving determination unit 11 receives a vehicle speed, the variation of the steering wheel, and the like through the CAN and location-based information including a current location of the vehicle, road information and traffic information, and the like through the multimedia CAN.

The abnormal driving determination unit 11 temporarily stores the information in the data storage unit 13 and an index required to determine the driving state is calculated through the operation statistic unit 12. For example, a speed range at which the vehicle can drive on while certain road conditions are present is determined by considering the speed limit on the road and the state of congestion on a corresponding highway and determines an appropriate range of an angle indicated by a steering wheel (wheel, handle) based on a radius of a curvature of the road.

Figure 2:
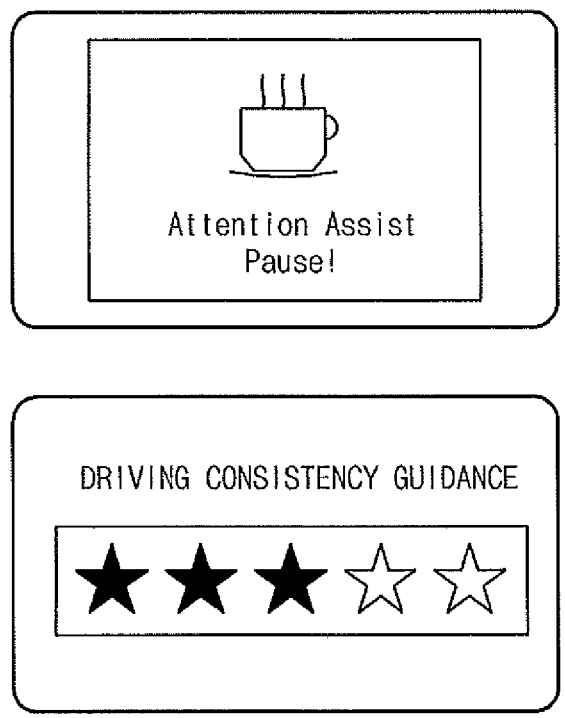
FIG. 2 is a view illustrating a warning message output operation of the system having the configuration of FIG. 1.

The abnormal driving determination unit 11 may store the calculated value through the above process in the data storage unit 13 and statistically cumulatively manage the calculated value at a predetermined time period. When any one of the values received via the CAN deviates from an acceptable range calculated by the operation statistic unit 12 or a range of reference data stored in the data storage unit 13, the abnormal driving determination unit 11 activates a warning signal over the warning display unit 20. As a result, as shown in FIG. 2, the warning lamp indicating the abnormal driving state in a cluster (dash board) of the vehicle turns on and a warning message indicating a dangerous state is output through a speaker.

For example, when there is excessively large variation of a steering wheel with respect to a traveling road condition (i.e., the curvature of the road does not matched the directional rotation of the steering wheel) or there is significant change in an acceleration and deceleration pattern which cannot be rationalized, the abnormal driving determination unit 11 determines the vehicle or driver is in an abnormal driving state.

Criterion in which the abnormal driving determination unit 11 determines the driving state of the vehicle is largely divided into three modes, that is, a high driving mode, e.g., for driving on a highway, a medium driving mode, e.g., for driving on a two lane highway/route or in a downtown area, and a low driving mode, e.g., for driving on a congested road.

For example, hen it is confirmed that a current traveling road is a two-lane highway or street by the information acquired from the navigation system, the abnormal driving determination unit 11 sets a medium speed driving mode as a reference value, compares the values calculated on the basis of the values calculated by the operation statistic unit 12 (the operation result for the acceptable range calculated on the basis of the location-based information, the SAS detection value and detection values of the acceleration sensor) and the angular velocity sensor with the data detected by each sensor, and determines whether or not abnormal driving is occurring based on the comparison result.

In the low speed driving mode, a measurement value from the acceleration sensor may be used and the curvature of the road, the vehicle speed, the vehicle course information-based current lateral acceleration, and the steering wheel value may be referred to define whether or not a dangerous situation is occurring.

That is, according to the exemplary embodiment, it is possible to implement a system that capable of effectively determining an abnormal driving state of the vehicle based on the road information received from the navigation system and the vehicle state information detected via the CAN.

Figure 3:
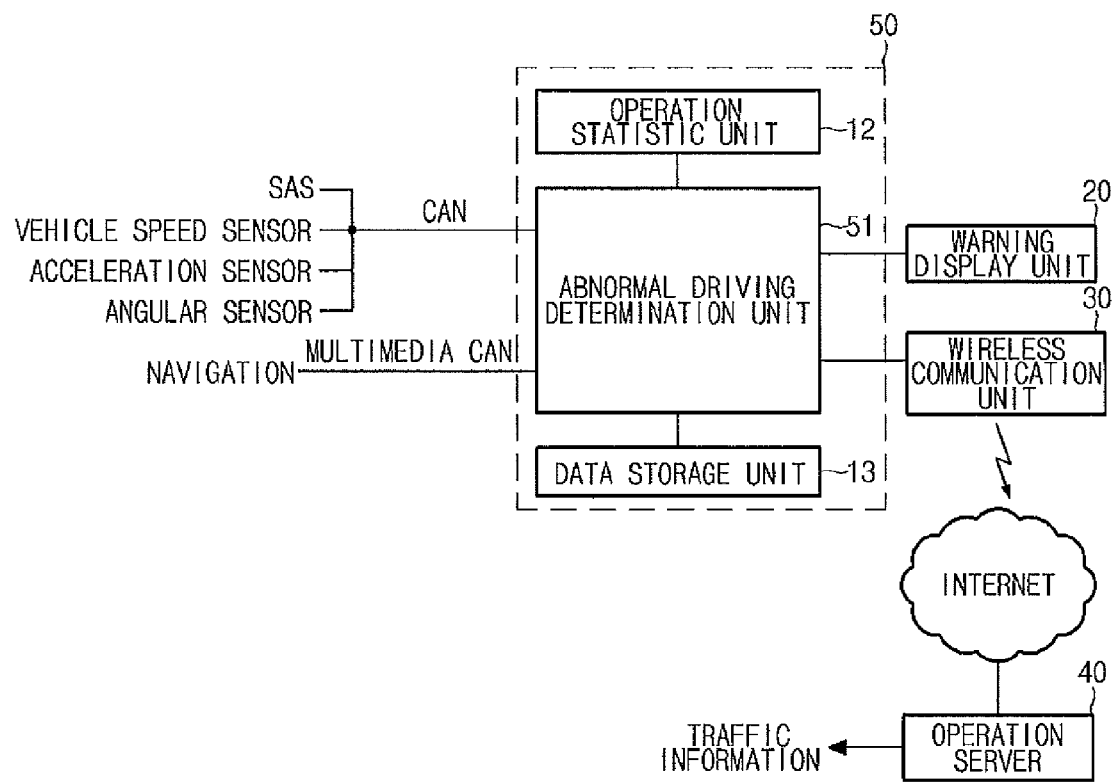
FIG. 3 is a functional block diagram of an abnormal driving state determination and warning system according to another exemplary embodiment of the present invention.

The present invention is not limited to the exemplary embodiment. The above-described exemplary embodiment may be modified without departing from the spirit and scope of the present invention. FIG. 3 illustrates a functional block diagram of a vehicle position information-based abnormal driving determination and warning system according to another embodiment of the present invention.

The information calculated by the operation statistic unit 12 may be used as significant information to other vehicles traveling over the corresponding road. In particular, from a result of analyzing information collected from a plurality of vehicles, the place in which a plurality of drivers commonly exhibit an abnormal driving state may be confirmed and applied to every vehicle which passes this point in the road. Thus, an effort to share corresponding information may additionally be applied to prevent accidents in a place where the road itself is confirmed to have caused a risk to drivers in the past.

In the second exemplary embodiment as shown in FIG. 3, a wireless communication unit 30 which accesses an external network (Internet) is further included. An operation server 40 which collects information from the plurality of vehicles and performs integral management is further included.

That is, an abnormal driving determination unit 51 transmits location information and time information from the place where the abnormal driving state is confirmed by a plurality of vehicles to the operation server 40 accessed via the Internet through the wireless communication unit 30. The operation server 40 extracts the location in which the plurality of vehicles commonly exhibit an abnormal driving state and transmits the corresponding location information to vehicles connected to a network as the location-based information or traffic information.

Figure 4:
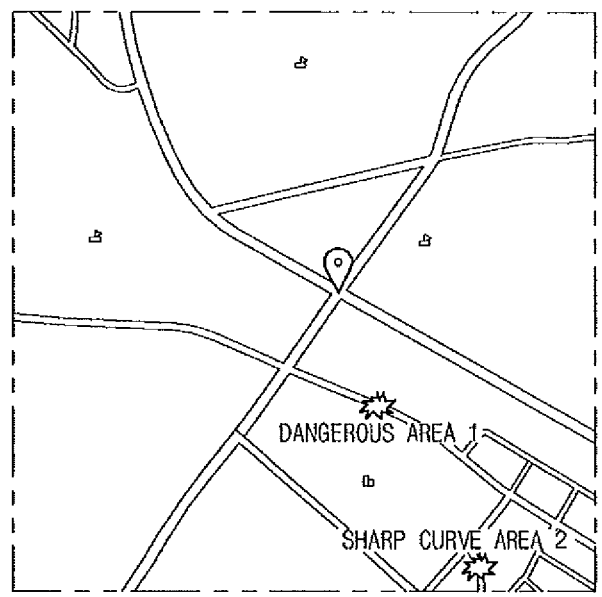
FIG. 4 is a view illustrating a warning message guiding a dangerous area to a driver.

The abnormal driving determination unit 51 of each vehicle receives information transmitted from the operation server 40 through the wireless communication unit 30 and warns the driver on the display unit 20 of the received information. Therefore, as shown in FIG. 4, the operation server 40 notifies drivers of a dangerous area or zone based on other driver's previous encounters.

According to the exemplary embodiment, it is possible to provide the system capable of reducing the risk of an accident and assisting a driver by sharing information from the plurality of vehicles with respect to a particular location in which the road condition is dangerous or conditions are poor.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system which determines an abnormal driving state of a vehicle, the system comprising:
   a sensing unit configured to include at least one sensor and sense a driving situation of a vehicle through the at least one sensor;
   a location information reception unit configured to receive location-based information of the vehicle;
   an operation statistic unit configured to calculate an acceptable range to be output by the sensing unit on a particular road based on the information detected by the sensing unit and the location-based information received by the location information reception unit; and
   an abnormal driving determination unit configured to compare values sensed by the sensing unit with values calculated by the operation statistic unit to determine whether or not the vehicle is driven in an abnormal state,
   wherein the acceptable range is criterion in which the abnormal driving determination unit determines a driving state of the vehicle, the acceptable range is divided into a high driving mode, a medium driving mode, and a low driving mode, and
   the abnormal driving determination unit determines a driving mode of the vehicle using the location-based information of the vehicle.

2. The system of claim 1, further comprising a data storage unit configured to cumulatively store values calculated by the operation statistic unit and manage the cumulatively stored data as reference data,
wherein the abnormal driving determination unit compares the values sensed by the sensing unit with the reference data stored in the data storage unit to determine whether or not the vehicle is driven in an abnormal state.

3. The system of claim 2, wherein the abnormal driving determination unit determines a current driving state to be an abnormal driving state when at least one of values sensed by the sensing unit deviates from a range of the reference data stored in the data storage unit.

4. The system of claim 1, wherein the abnormal driving determination unit determines a current driving state as an abnormal driving state when at least one of the values sensed by the sensing unit is deviated from the acceptable range calculated by the operation statistic unit.

5. The system of claim 1, wherein the sensing unit includes at least one selected from the group consisting of a steering angle sensor (SAS), a vehicle speed sensor, an acceleration sensor, and an angular velocity sensor.

6. The system of claim 1, wherein the location-based information includes at least one selected from the group consisting of global positioning system (GSP) location information, map information, road information, and traffic information.

7. The system of claim 1, further comprising a warning display unit configured to output a warning message according control of the abnormal driving determination unit.

8. The system of claim 7, wherein a wireless communication unit configured to access an external network is further included in the vehicle and an operation server, which is connected to the external network and configured to collect at least one piece of information transmitted from the wireless communication unit of the vehicle and perform integral management, is further included outside the vehicle,
the abnormal driving determination unit transmitting location information from a location of a confirmed abnormal driving state to the operation server through the wireless communication unit.

9. The system of claim 8, wherein the operation server is configured to periodically transmit the collected information to at least one vehicle, and
the abnormal driving determination unit inside the vehicle is configured to determine a dangerous area based on the information received from the operation server through the wireless communication unit and to output the warning message through the warning display unit.

10. The system of claim 1, wherein the operation statistic unit and the abnormal driving determination unit is included in a control unit constituted of an electronic control unit (ECC).

11. A system comprising:
a first unit including at least one sensor and configured to sense various driving characteristics of a vehicle through the at least one sensor;
a second unit configured to receive location-based information of the vehicle;
a control unit configured to calculate an acceptable range to be output by the first unit on a particular road based on the information detected by the first unit and the location-based information received by the second unit, and compare values sensed by the first unit with values calculated by the control unit to determine whether or not the vehicle is driven in an abnormal state,
wherein the acceptable range is criterion in which the abnormal driving determination unit determines a driving state of the vehicle, the acceptable range is divided into a high driving mode, a medium driving mode, and a low driving mode, and
the abnormal driving determination unit determines a driving mode of the vehicle using the location-based information of the vehicle.

12. The system of claim 11, further comprising a third unit configured to cumulatively store values calculated by the control unit for a constant time and manage the cumulatively stored data as reference data,
wherein the control unit compares values sensed by the first unit with the reference data stored in the third unit to determine whether or not the vehicle is driven in an abnormal state.

13. The system of claim 12, wherein the control unit determines a current driving state to be an abnormal driving state when at least one of values sensed by the first unit deviates from a range of reference data stored in the third unit.

14. The system of claim 11, wherein the control unit determines a current driving state as an abnormal driving state when at least one of the values sensed by the first unit is deviated from the acceptable range calculated by the control unit.

15. The system of claim 11, wherein the first unit includes at least one selected from the group consisting of a steering angle sensor (SAS), a vehicle speed sensor, an acceleration sensor, and an angular velocity sensor.

16. The system of claim 11, wherein the location-based information includes at least one selected from the group consisting of global positioning system (GSP) location information, map information, road information, and traffic information.

17. The system of claim 11, further comprising a warning display unit configured to output a warning message according control of the control unit.

18. The system of claim 17, wherein a wireless communication unit is configured to access an external network is further included in the vehicle and a server, which is connected to the external network and configured to collect at least one section of information transmitted from the wireless communication unit of the vehicle and perform integral management, is further included outside the vehicle,
the control unit transmits location information at a point in which the abnormal driving state is confirmed during driving to the operation server through the wireless communication unit.

19. The system of claim 18, wherein the operation server is configured to periodically transmit the collected information to at least one vehicle, and
the control unit inside the vehicle is configured to determine that an area is dangerous based on the information received from the server through the wireless communication unit and to output the warning message through the warning display unit.

20. The system of claim 11, wherein the control unit is an electronic control unit (ECC).

21. A computer readable medium containing program instructions executed by a control unit, the computer readable medium comprising:
program instructions that calculate an acceptable range to be output by a first unit on a particular road based on the information detected by the first unit and location-based information received by a second unit; and
program instructions that compare values sensed by the first unit with values calculated by the operation statistic unit to determine whether or not the vehicle is driven in an abnormal state, wherein the acceptable range is criterion in which the program instructions determine a driving state of the vehicle, the acceptable range divided into a high driving mode, a medium driving mode, and a low driving mode, and the program instructions determines a driving mode of the vehicle using the location-based information of the vehicle.

22. A method comprising:

calculating, by a control unit, an acceptable range to be output by a first unit on a particular road based on the information detected by the first unit and location-based information received from a second unit; and comparing, by the control unit, values sensed by the first unit with values calculated by the control unit to determine whether or not the vehicle is driven in an abnormal state, wherein the acceptable range is criterion in which the control unit determines a driving state of the vehicle, the acceptable range is divided into a high driving mode, a medium driving mode, and a low driving mode, and the control unit determines a driving mode of the vehicle using the location-based information of the vehicle.

* * * * *